United States Patent [19]

Richmond

[11] Patent Number: 4,968,933

[45] Date of Patent: Nov. 6, 1990

[54] AUTOMOTIVE WHEEL SPEED SENSOR ASSEMBLY WITH STATOR POLE PIECE CARRIED WITHIN APERTURE OF FIELD COIL

[75] Inventor: James W. Richmond, Carmel, Ind.

[73] Assignee: Emhart Industries, Inc., Indianapolis, Ind.

[21] Appl. No.: 305,068

[22] Filed: Feb. 2, 1989

Related U.S. Application Data

[60] Division of Ser. No. 171,162, Mar. 21, 1988, which is a continuation of Ser. No. 835,514, Mar. 3, 1986, abandoned.

[51] Int. Cl.⁵ .................. G01P 3/488; B60T 8/32; H02K 21/26
[52] U.S. Cl. .................. 324/174; 73/519; 188/181 R; 310/168
[58] Field of Search .................. 324/173, 174, 208; 310/155, 168; 73/518, 519; 188/181 R, 181 A

[56] References Cited

U.S. PATENT DOCUMENTS

| 2,798,976 | 7/1957 | Eckel et al. | 324/174 X |
|---|---|---|---|
| 3,619,678 | 11/1971 | Ruof | 310/168 X |
| 3,683,219 | 8/1972 | Kruse | 324/174 X |
| 3,870,911 | 3/1975 | Toyama et al. | 324/174 X |
| 3,960,248 | 6/1976 | Tribe | 324/174 X |
| 4,027,753 | 6/1977 | Lantz | 188/181 R |
| 4,096,624 | 6/1978 | Gray et al. | 310/168 X |
| 4,529,933 | 7/1985 | Bleeke | 324/173 |
| 4,689,557 | 8/1987 | Smith et al. | 324/174 |

FOREIGN PATENT DOCUMENTS

| 1268399 | 5/1968 | Fed. Rep. of Germany | 324/174 |
|---|---|---|---|
| 208667 | 12/1983 | Japan | 324/173 |
| 835020 | 5/1960 | United Kingdom | 324/174 |

*Primary Examiner*—Gerard R. Strecker
*Attorney, Agent, or Firm*—Carl A. Forest

[57] ABSTRACT

There is described a speed sensor that is particularly adaptable to moving vehicles such as automobiles. A permanent magnet, stator assembly including a stator pole piece, and field coil having an aperature are held within a cup that is adapted to mate a bearing assembly of a non-driven wheel of the vehicle. The stator pole piece is carried substantially within the aperature of the field coil. Rotor poles are carried on the wheel spindle. A magnetic flux is provided by the permanent magnet, the flux passing through the stator poles and the rotor poles which rotate with the wheel in close proximity to the stator assembly, causing a changing flux field. The changing magnetic-flux in turn generates an alternating voltage current in the field coil. The alternating current so generated is then fed through an electrical terminal to a vehicle computer.

5 Claims, 2 Drawing Sheets

AUTOMOTIVE WHEEL SPEED SENSOR ASSEMBLY WITH STATOR POLE PIECE CARRIED WITHIN APERTURE OF FIELD COIL

BACKGROUND OF THE INVENTION

This application is a division of application Ser. No. 07/171,162 filed Mar. 21, 1988, which itself is a continuation of application Ser. No. 06/835,514 filed Mar. 3, 1986, now abandoned.

The present invention relates to a speed sensor and more particularly to a speed sensor that is particularly useful in braking systems of vehicles such as automobiles.

Magnetic type induction speed sensors have been used to measure the speed of rotating members for some years. However, when used in automobiles, for example, the systems were attached externally to the wheel bearing assembly and were exposed to the environment. This is especially hazardous when it is considered that the vehicle travels over all types of roadways.

The present invention represents an improvement over such prior art systems in that the speed sensor functions within a grease cup of the automobile's wheel bearing assembly.

SUMMARY OF THE INVENTION

Accordingly there is provided a speed sensor that is particularly adaptable to vehicle braking systems which in general comprises a cup, an open end of which is adapted to mate a wheel bearing assembly of a vehicle; a permanent magnet, a stator assembly, and a field coil all carried in said cup; and electrical terminals electrically coupled to said field coil and extending outside said cup.

DETAILED DESCRIPTION OF THE INVENTION

Figure 1:
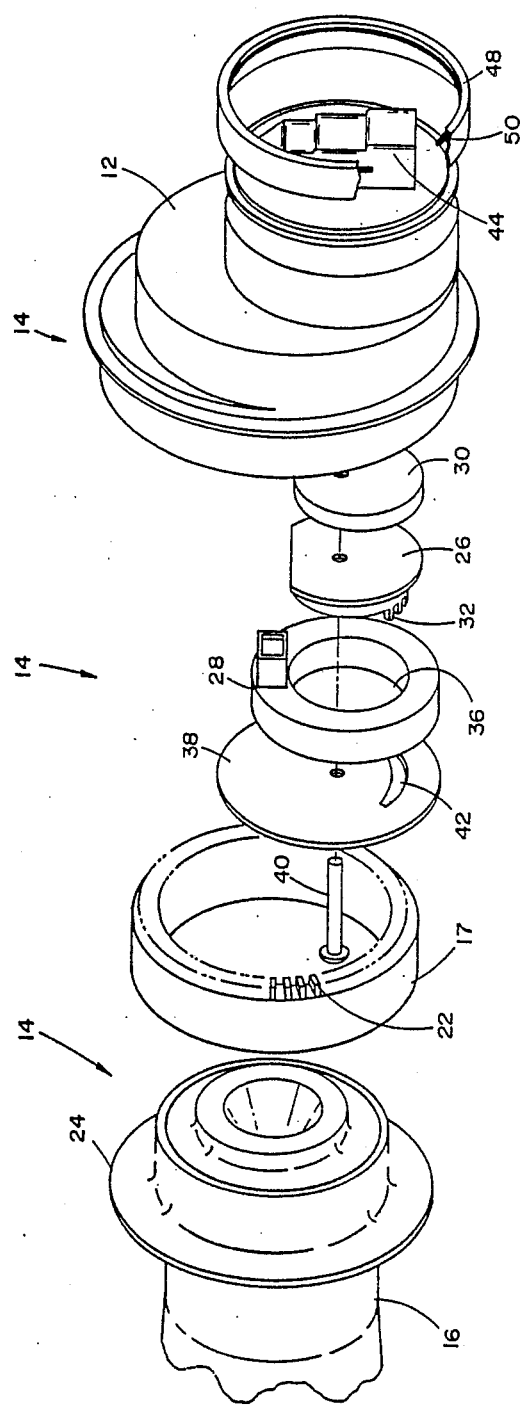
FIG. 1 is an exploded view of a speed sensor assembly employing the features of the invention.
Figure 2:
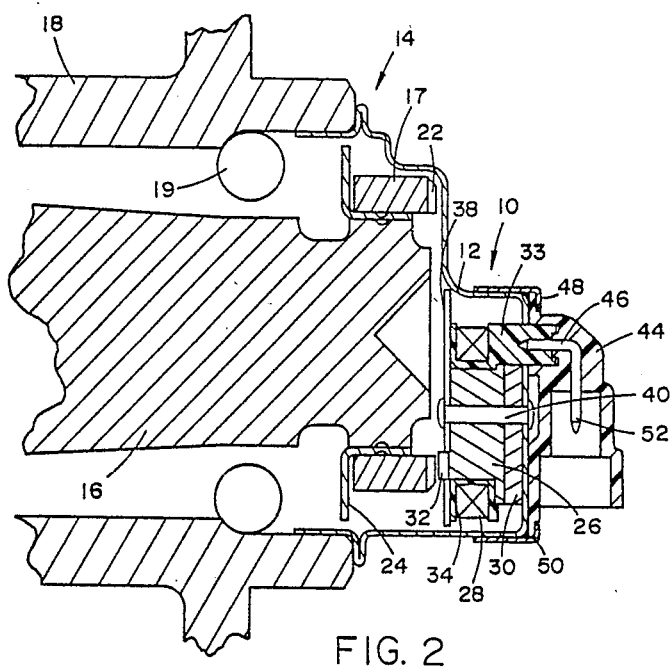
FIG. 2 is a partial section of the speed sensor of FIG. 1.

Referring now to FIGS. 1 and 2, there is shown a speed sensor assembly 10 that is contained within a grease cup 12 of a wheel bearing assembly 14 of an automobile. In general, wheel bearing assembly 14 includes a spindle 16 that rotates within housing 18 through bearings 19. An automobile wheel (not shown) is carried on spindle 16 to be rotated with the spindle. Normally, the speed sensor assembly will be located on a spindle assembly of a wheel that is not driven by the automobile engine. Grease cup 12 is fabricated of steel in order to provide good flux through the cup.

A plurality of rotor poles 22 extend from a rotor ring 17 which is press fitted onto spindle 16 through flange 24 which is also press fitted onto the spindle. The rotor ring as well as the poles are fabricated of steel or sintered iron in order to provide a good magnetic flux path.

Speed sensor assembly 10 includes a stator pole piece 26, a field coil 28, and a permanent magnet 30. Stator pole piece 26 is fabricated from steel or sintered iron and includes a plurality of poles 32 of the same polarity that extend over an arc of a portion of a circle and through a slot 42 of plate 38 to be in working relation to rotor poles 22. Permanent magnet 30 is fabricated of a barium ferrite or similar magnet material. Field coil 28 is carried on a coil bobbin 33 in an annular space 34. The bobbin has a central aperture 36 in which the stator pole piece 26 is substantially carried. Here, "substantially carried" means the structure as shown in FIG. 2 in which the major portion of stator pole piece 26 is contained within the aperture 36. The whole assembly is held together through plate 38 and rivet 40.

An electrical connector 44 is attached to grease cup 12 and carries two electrical terminals 46 which engage bobbin 33. As shown, the terminals are bent over at a right angle to create a compact assembly. The terminal is held in place by ring 48 which is connected to cup 12 in sealing relation through o-ring 50.

In operation, a magnetic flux path is created around the grease cup 12 and the rotor ring 17 and through stator 26 by the permanent magnet 30 when the rotor and stator poles are aligned. When rotor poles 22 are rotated simultaneously with the rotation of spindle 16, the magnetic flux in the gap between the rotor poles 22 and stator poles 32 changes in intensity as the rotor moves from tooth to tooth of the stator poles. That is, upon misalignment of the rotor and stator poles, the flux sweeps through field coil 28 to a position around an edge of permanent magnet 30 causing a change in flux at the gap. This changing intensity in combination with the flux sweep causes an alternating voltage to be generated in field coil 28 in which is then fed to a computer through electrical terminals 46. The use of a few stator poles as opposed to a single pole or poles extending around a complete circle provides the strongest magnetic pulsations and optimum generation of AC voltage in coil 28.

In addition, both the stator poles and rotor poles are tapered toward their tips such that the tip is less in thickness than the space between individual teeth. This also increases the concentration of the magnetic flux generated at the poles.

Figure 3:
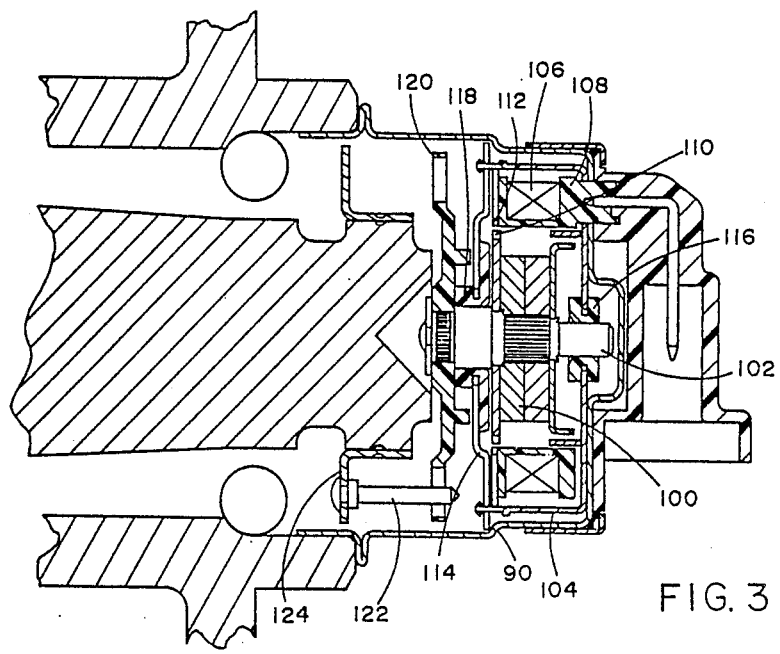
FIG. 3 is a partial section of another embodiment of a speed sensor assembly.

Another embodiment of the invention is shown in FIG. 3. In this embodiment, the rotor poles are made part of the speed sensor assembly that is contained within grease cup 90. Thus as shown, speed sensor assembly includes a stator cup 104 having an open end, a permanent magnet 100 carried on a rotatable hub 102, field coil 106 carried in bobbin 108, and rotor poles 110. Stator poles 112 are attached to a stator cup 104. They interact magnetically with rotor poles 110. A cover plate 114 closes the open end of the stator cup. Hub 102 rotates in bushings 116 and 118.

Hub 102 is mechanically coupled to spindle 16 through a bar or plate 120 that is fixed to the hub and a pin 122 that is carried by the spindle through flange 124. Rotation of spindle 16 causes engagement of pin 122 with bar 120 to rotate hub 102 and thus permanent magnet 100 and rotor poles 110. Rotation of the rotor poles causes an alternating current to be induced in field coil 106 in the same manner as that with respect to the embodiment of FIGS. 1 and 2.

What is claimed is:

1. The combination of a vehicle wheel speed sensor with a vehicle wheel bearing assembly, said combination comprising:
    a wheel bearing;
    a wheel support;

a rotatable wheel assembly rotatably supported by said support through said wheel bearing;

rotor means for providing a rotor pole that rotates with said rotatable wheel assembly;

stator means for providing a stator pole that does not rotate with said rotatable wheel assembly;

support means for supporting said rotor means and said stator means on said vehicle so that as said wheel assembly rotates with respect to said wheel support said rotor pole is at times aligned with said stator pole and at other times is not so aligned;

magnetic means for generating magnetic flux through said rotor pole and said stator pole, said magnetic means including a permanent magnet; and means for interacting with said magnetic flux to generate an electrical signal representative of the speed of said vehicle wheel in response to changes in said flux caused by said rotor pole moving with respect to said stator pole when said wheel assembly rotates with respect to said wheel support, said means for interacting comprising a field coil having an aperture, and a stator pole piece which comprises said stator pole and a ferromagnetic member connecting said magnet and said stator pole, and wherein said stator pole piece is substantially carried within said aperture.

2. The combination of claim 1 wherein said wheel bearing assembly has an opening therein and said speed sensor further includes cup means for closing said opening, said cup means being magnetically coupled to said magnetic means and providing at least a portion of a magnetic path between said rotor pole and said magnet passing outside of said aperture of said field coil so that the flux path passing from said magnet through said pole piece to said rotor and hence through said cup means encircles said field coil.

3. The combination of claim 1 wherein said stator means has no more than a few poles.

4. In a speed sensor assembly for providing an electrical signal representative of the speed of a wheel of an automotive vehicle, said assembly of the type including rotor means for providing a rotor pole that rotates with said wheel, stator means for providing a stator pole that does not rotate with said wheel, magnetic means for generating magnetic flux through said rotor pole and said stator pole, said magnetic means including a permanent magnet, and means for interacting with said magnetic flux to generate an electrical signal representative of the speed of said vehicle wheel in response to changes in said flux caused by said rotor pole moving with respect to said stator pole when said wheel rotates, the improvement wherein said means for interacting comprises:

a field coil having an aperture; and a stator pole piece comprising said stator pole and a ferromagnetic member connecting said magnet and said stator pole; and wherein said stator pole piece is substantially carried within said aperture.

5. A speed sensor assembly as in claim 4 wherein said automotive vehicle is of the type having a wheel bearing assembly in which said wheel turns, said wheel bearing assembly having an opening therein, and further including a cup means for closing said opening, said cup means being magnetically coupled to said magnetic means and providing at least a portion of a magnetic path between said rotor pole and said magnet passing outside of said aperture of said field coil so that the flux path passing from said magnet through said pole piece to said rotor and hence through said cup means encircles said field coil.

* * * * *